J. J. KEPPEL.
WIRE STRAINER.
APPLICATION FILED MAR. 20, 1911.
1,074,872.
Patented Oct. 7, 1913.
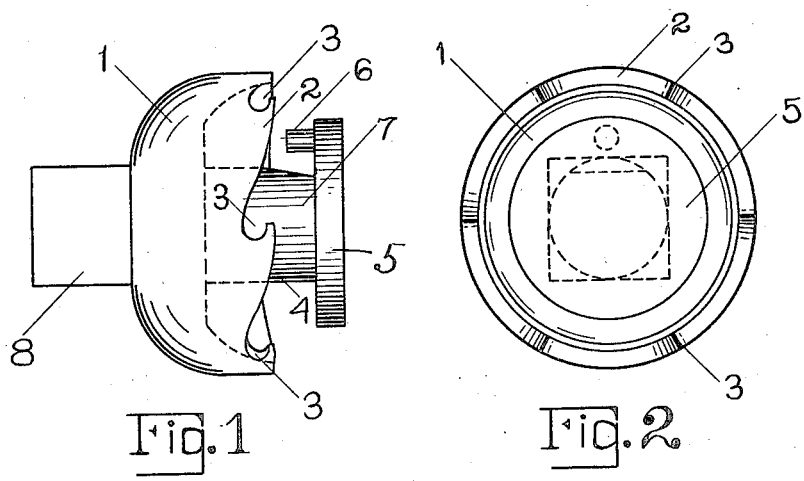
Witnesses:
Ben R. Newcomb
Marguerite A. Hefling
Inventor:
John J. Keppel
By B. Singer,
Attorney

UNITED STATES PATENT OFFICE.

JOHN JOSEPH KEPPEL, OF DUNEDIN, NEW ZEALAND, ASSIGNOR OF ONE-HALF TO SAMUEL ALEXANDER LYTTLE, OF OUTRAM OTAGO, NEW ZEALAND.

WIRE-STRAINER.

1,074,872. Specification of Letters Patent. Patented Oct. 7, 1913.

Application filed March 20, 1911. Serial No. 615,674.

*To all whom it may concern:*

Be it known that I, JOHN JOSEPH KEPPEL, a subject of the King of Great Britain, residing at Dunedin, New Zealand, have invented new and useful Improvements in Wire-Strainers, of which the following is a specification.

This invention relates to improvements in that class of wire strainer which comprises a body having ratchet teeth formed around its rim, a drum projecting within and at the back of the body, and a lever for rotating the drum.

The invention is illustrated in the accompanying drawings, in which like numerals of reference indicate like parts, and Figure 1 is a side view, and Fig. 2 a rear view of a wire strainer constructed according to this invention.

As shown in Figs. 1 and 2, the rim 2, of the cup shaped body 1 has formed therearound a series of preferably scroll-shaped ratchet teeth (3) or notches adapted to receive the fence wire and prevent it springing out. These teeth (3) are arranged radially with respect to the center of the cup-shaped body (1), and so that each tooth has another tooth diametrically opposite it on the opposite side of the cup-shaped body. Projecting centrally from the interior of the cup (1) is a drum (4) the outer end of which extends beyond the toothed rim (2) of the cup (1) and has a collar or flange (5) at its end to prevent the fence wire slipping off the drum (4). A small pin (6) projects inwardly from the inner face of the collar or flange (5) at a point preferably obaut midway between the peripheries of the flange and the drum respectively, and serves to engage the wire for the purpose of straining. Immediately below the pin (6) a portion of the surface of the drum (4) is cut away as shown at (7) to give more clearance. Projecting from the base or bottom of the cup is a squared or otherwise suitably formed shank (8) to take a wrench or spanner.

The operation of this wire strainer is as follows: The strainer is passed on to the fence wire so that the latter lies under the pin (6) and transversely across the drum (4). A spanner is then applied to the squared shank (8) and the strainer is rotated so as to wind the fence wire upon the drum (4) until sufficiently strained, a tooth (3) engaging the wire on each side of the drum and preventing it or the strainer from unwinding in either direction.

Having now described my invention, what I claim as new and desire to secure by Letters Patent is:—

A wire strainer comprising a one piece cup-shaped body having undercut wire engaging teeth formed in its rim and a drum projecting from within said cup; means for engaging a fence wire with the drum comprising a flange on the end of said drum, spaced above said ratchet teeth, and a pin projecting from the inner face of said flange over said drum and having its lower end spaced above said ratchet teeth, a portion of said drum being cut away beneath said pin, substantially as described.

In testimony whereof I have signed my name to this specification in the presence of two subscribing witnesses.

JOHN JOSEPH KEPPEL.

Witnesses:
ANDREW JOHN PARK,
JOHN RUTHERFORD PARK.

Copies of this patent may be obtained for five cents each, by addressing the "Commissioner of Patents, Washington, D. C."